Jan. 17, 1950  J. B. ANINGA ET AL  2,494,856
DEVICE FOR MAKING COATED WELDING RODS
Filed Feb. 6, 1947

J. B. ANINGA & JAN TENGER
INVENTORS

BY
AGENT

Patented Jan. 17, 1950

2,494,856

UNITED STATES PATENT OFFICE 2,494,856

DEVICE FOR MAKING COATED WELDING RODS

Johannes Bernard Aninga and Jan Tenger, Eindhoven, Netherlands, assignors to Hartford National Bank and Trust Company, Hartford, Conn., as trustee Application February 6, 1947, Serial No. 726,886
In the Netherlands May 11, 1944

Section 1, Public Law 690, August 8, 1946
Patent expires May 11, 1966

3 Claims. (Cl. 18—13)

This invention relates to a known device for the coating of welding rods. The device comprises a bin for the uncoated welding rods, and a pair of continuously driven rollers for conveying the uncoated welding rods from the bin to a moulding press for pressing the coating on the rods. The feed of the uncoated rods from the bin to the moulding press is arranged to take place without interruption, in order to permit the coating press to operate without interruption, which is desirable if the form and composition of the coating sheath is to be of good quality.

In order to achieve the aforesaid purpose, the device according to the invention is provided with at least one pair of friction rollers for the supply of the rods from the bin to the moulding press. At least one of each pair of friction rollers has a conical peripheral surface comprising ribs and grooves, the rollers conveying the rods from the bin to the moulding press at a speed greater than the speed of the rods while in the moulding press. The rollers are connected to a driving motor by means of a friction clutch.

Each of the rods supplied from the bin is forced against the rear end of the rod in the moulding press, even though there is a short interval of time between the carrying off of a rod to the moulding press and the feed of the next rod from the bin, because the speed of the rod as fed from the bin is greater than the speed of the rod in the moulding device.

When the rod supplied from the bin comes into contact with the rod already contained in the moulding press, the speed of the former will be decreased to the speed of the rod in the press. Were the rods fed by rollers without the intermediary of a friction clutch, the surface of the roller would slip along the surface of the rod, so that wear and damage of these surfaces would be unavoidable. In the construction according to the invention this slip occurs in the friction clutch provided for this purpose. The ribs and grooves on the sheath of the driving rollers prevent the slip between the rollers and the rods, so that at these spots wear is avoided.

In order that the invention may be clearly understood and readily carried into effect, it will now be set out more fully with reference to the accompanying drawing, in which one form of construction is given by way of example.

Figure 1:
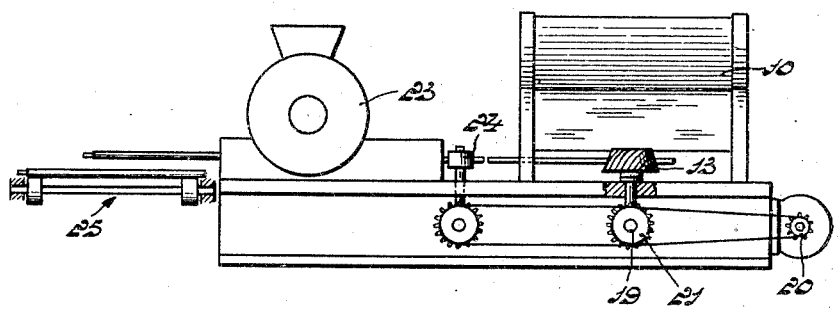
Fig. 1 is a side elevation, partly diagrammatical, of a device for applying the coating mass about welding rods.
Figure 2:
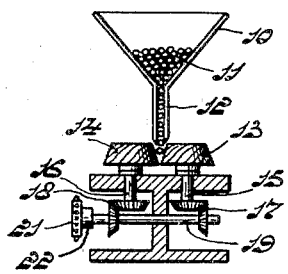
Fig. 2 is a sectional view taken through the bin of the same device.

In the figures, 10 designates a bin in which the uncoated welding rods are piled. The bin tapers so as to be funnel-shaped, its smallest width being equal to the thickness of the welding rod, so that only one welding rod at a time will be fed from the bin to the press. The bin can be provided with a pair of rotary eccentrically supported rollers (not shown) which will set the rods into a rolling movement, in order that the carrying off in the narrow slit 12 may be effected smoothly.

The lowermost rod in the said part 12 of the bin drops between the two driving rollers 13 and 14, whose peripheral surfaces are conical and which in addition comprise ribs and grooves. These ribs and grooves are at an angle with the generatrices of the conical surface of the said rollers and in such a direction that the rod dropping between these rollers is drawn still further between the two surfaces. The ribs have such a sloped direction at the point of contact between the roller and the rod that the rib concerned extends towards the greater circumference of the conical roller in a direction opposite to that to which the rod has to be carried off.

The rollers 13 and 14 are secured to two shafts 15 and 16 respectively which via bevel gears 17 and 18 are driven from a common shaft 19 which, through the intermediary of a chain gearing, is coupled with a driving motor 20. The sprocket wheel 21 however, is not secured direct to this shaft, but through the intermediary of a slipping clutch 22.

After the rods are carried from the bin by the rollers 13 and 14, they are moved into the direction of the press 23. Closely in front of the entrance to the press the rods are moved by a set of rollers 24 which are driven direct from the motor 20 by means of a chain. These rollers govern the speed with which the uncoated welding rods are moved in the press 23. The speed with which the rods are fed by the rollers 13 and 14 from the bin should, however, exceed the speed of the rods through the press, as a result of the driving by the rollers 24, because some time elapses between the complete carrying off of a rod from the bin 10 and the dropping of the next following rod between the rollers 13 and 14. However, the rods must be passed through the press 23 uninterruptedly in order to prevent an accumulation of coating masses in the moulding channel. It is necessary to make up for the aforesaid time discrepancy by an initially higher speed of the rods just fallen between the rollers 13 and 14. For this purpose the peripheral speed of the rollers 13 and 14 is higher than that of the rollers 24. As soon as this time discrepancy is recovered the speed of the newly fed rod must be reduced to that of the rod already partly enclosed in the press. As soon as two successive rods have caught up with one another the coupling 22 slips to such an extent that the peripheral speed of the rollers 13 and 14 equals that of the rollers 24. As this slip can occur in the coupling 22 specially constructed for this purpose there need not be any difference in speed between the periphery of the rollers 13 and 14 and the rods fed by these rollers.

After the rod has been coated, it is pushed out of the press by the next following rod to be coated; it drops on a conveyor belt 25 and is thence carried to the drying device.

What we claim is:

1. Apparatus for coating welding electrodes comprising a bin adapted to supply electrodes, a moulding press for the continuous application of coating to an electrode, a feeding device comprising a first pair of driven friction rollers, said rollers arranged for normally feeding the electrodes continuously from said bin to said moulding press at a predetermined rate of speed, a second pair of friction rollers arranged for moving the electrodes through said moulding press at a second predetermined rate of speed which is less than said first rate of speed, driving means to drive continuously both pairs of said friction rollers, and a friction clutch coupling said driving means to said first pair of friction rollers, whereby the speed of an electrode being fed to said moulding press is for a time greater than the speed of an electrode traveling through said moulding press.

2. Apparatus for coating welding electrodes comprising a bin adapted to supply electrodes, a moulding press for the continuous application of coating to an electrode, a feeding device comprising a pair of driven friction rollers, at least one of said rollers having a conical peripheral ribbed working surface, said rollers arranged for feeding the electrodes from said bin to said moulding press, driving means to drive continuously said friction rollers, and a friction clutch coupling said driving means to said friction rollers, said friction rollers being driven at a rate whereby the speed of an electrode being fed to said moulding press is for a time greater than the speed of an electrode traveling through said moulding press.

3. An apparatus as claimed in claim 2, wherein the ribs on the conical peripheral ribbed working surface at the region of contact with the electrode are arranged to slope from the smaller to the larger diameter of the roller in a direction opposite that to which the electrode moves from said bin to said moulding press.

JOHANNES BERNARD ANINGA.
JAN TENGER.

REFERENCES CITED

The following references are of record in the file of this patent:

UNITED STATES PATENTS

| Number | Name | Date |
|---|---|---|
| 2,210,786 | Wasmund | Aug. 6, 1940 |
| 2,213,481 | Alder et al. | Sept. 3, 1940 |
| 2,249,085 | Lange | July 15, 1941 |

FOREIGN PATENTS

| Number | Country | Date |
|---|---|---|
| 468,853 | Great Britain | of 1937 |